(12) United States Patent
Lee et al.

(10) Patent No.: US 10,122,011 B2
(45) Date of Patent: Nov. 6, 2018

(54) MULTI LAYERED ELECTRODE AND METHOD OF MANUFACTURING THE SAME

(71) Applicant: LG Chem, Ltd., Seoul (KR)

(72) Inventors: Iljoon Lee, Daejeon (KR); Jae Hyun Lee, Daejeon (KR); Jihyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 982 days.

(21) Appl. No.: 14/485,976

(22) Filed: Sep. 15, 2014

(65) Prior Publication Data

US 2014/0377661 A1 Dec. 25, 2014

Related U.S. Application Data

(63) Continuation of application No. PCT/KR2013/003268, filed on Apr. 18, 2013.

(30) Foreign Application Priority Data

Apr. 18, 2012 (KR) .................. 10-2012-0040105

(51) Int. Cl.

| H01M 4/36 | (2006.01) |
|---|---|
| H01M 4/485 | (2010.01) |
| H01M 4/525 | (2010.01) |
| H01M 4/131 | (2010.01) |
| H01M 4/505 | (2010.01) |
| H01M 10/052 | (2010.01) |
| H01M 4/04 | (2006.01) |
| H01M 4/1391 | (2010.01) |
| H01M 4/62 | (2006.01) |
| H01M 4/66 | (2006.01) |
| H01M 10/0525 | (2010.01) |
| H01M 4/02 | (2006.01) |

(52) U.S. Cl.
CPC ......... *H01M 4/366* (2013.01); *H01M 4/0404* (2013.01); *H01M 4/131* (2013.01); *H01M 4/1391* (2013.01); *H01M 4/364* (2013.01); *H01M 4/485* (2013.01); *H01M 4/505* (2013.01); *H01M 4/525* (2013.01); *H01M 4/623* (2013.01); *H01M 4/625* (2013.01); *H01M 4/661* (2013.01); *H01M 10/052* (2013.01); *H01M 10/0525* (2013.01); *H01M 2004/021* (2013.01); *H01M 2200/20* (2013.01); *H01M 2220/30* (2013.01); *Y02T 10/7011* (2013.01)

(58) Field of Classification Search
None
See application file for complete search history.

(56) References Cited

U.S. PATENT DOCUMENTS

| 2006/0238162 A1* | 10/2006 | Cheon ................... | H01M 2/021 320/112 |
|---|---|---|---|
| 2008/0107968 A1* | 5/2008 | Patoux .................. | H01M 4/485 429/223 |
| 2008/0160410 A1 | 7/2008 | Sun et al. | |
| 2008/0241696 A1* | 10/2008 | Hinoki .................. | H01M 4/133 429/231.8 |
| 2011/0165462 A1 | 7/2011 | Zhamu et al. | |
| 2012/0156560 A1 | 6/2012 | Hong et al. | |

FOREIGN PATENT DOCUMENTS

| JP | H11-31509 A | 2/1999 |
|---|---|---|
| JP | 2000-156229 A | 6/2000 |
| JP | 2001-243952 A | 9/2001 |
| JP | 2002151055 A | 5/2002 |
| JP | 2004119218 A | 4/2004 |
| JP | 2008521196 A | 6/2008 |
| JP | 2008-293875 A | 12/2008 |
| JP | 2009009727 A | 1/2009 |
| JP | 2009-505929 A | 2/2009 |
| JP | 2010135272 A | 6/2010 |
| JP | 2012-064537 A | 3/2012 |
| JP | 2012528451 A | 11/2012 |
| KR | 20060027255 A | 3/2006 |
| KR | 100598491 B1 | 7/2006 |
| KR | 20060095364 A | 8/2006 |
| KR | 20100032053 A | 3/2010 |
| KR | 20100131921 A | 12/2010 |

OTHER PUBLICATIONS

International Search Report for Application No. PCT/KR2013/003268 dated Jul. 23, 2013.
K.M. Colbow, et al., "Structure and Electrochemistry of the Spinel Oxides LiTi2O4 and Li4/3Ti5/3O4." Journal of Power Sources, May 1, 1989, pp. 397-402.
Arumugam Manthiram et al. "Ch. 12—Lithium Intercalation Cathode Materials for Lithium-Ion Batteries." Handbook of Battery Materials, 2nd ed., Aug. 29, 2011, pp. 343-375.
Supplemental Search Report from corresponding European Application No. EP 13 77 7672, dated Jul. 9, 2015.

* cited by examiner

*Primary Examiner* — Maria Laios
(74) *Attorney, Agent, or Firm* — Lerner, David, Littenberg, Krumholz & Mentlik, LLP

(57) ABSTRACT

Disclosed are an electrode for secondary batteries including an electrode mixture coated on one surface or opposite surface of an electrode current collector, and a method of manufacturing the same. The electrode mixture includes an electrode mixture layer A, which is a portion close to a current collector, and an electrode mixture layer, which is a portion distant from a current collector. The electrode mixture layer A includes a mixture of two active materials, average diameters of which are different, and the electrode mixture layer B includes active materials, average diameters of which are the same.

13 Claims, No Drawings

MULTI LAYERED ELECTRODE AND METHOD OF MANUFACTURING THE SAME

CROSS-REFERENCE TO RELATED APPLICATIONS

The present application is a continuation of International Application No. PCT/KR2013/003268, filed on Apr. 18, 2013, which claims priority from Korean Patent Application No. 10-2012-0040105, filed on Apr. 18, 2012, in the Korean Intellectual Property Office, the disclosures thereof are incorporated herein by reference.

TECHNICAL FIELD

The present invention relates to an electrode for secondary batteries including an electrode mixture coated on one surfaces or opposite surfaces of an electrode current collector. More specifically, the present invention relates to an electrode for secondary batteries, a mixture of which includes an electrode mixture layer A, which includes a mixture of two active materials having different average diameters, disposed close to a current collector and an electrode mixture layer B, which includes active materials having the same average diameters, disposed distant from a current collector.

BACKGROUND ART

As mobile device technology continues to develop and demand therefor continues to increase, demand for secondary batteries as energy sources is rapidly increasing. Among these secondary batteries, lithium secondary batteries, which exhibit high energy density and operating potential, have long cycle lifespan, and have a low self-discharge rate, are commercially available and widely used.

In addition, as recent interest in environmental problems is increasing, research into electric vehicles (EVs), hybrid electric vehicles (HEVs), and the like that can replace vehicles using fossil fuels, such as gasoline vehicles, diesel vehicles, and the like, which are one of the main causes behind air pollution, is actively conducted. As a power source of EVs, HEVs, and the like, research into lithium secondary batteries having high energy density, high discharge voltage, and high output stability is actively carried and such lithium secondary batteries are mainly used.

A lithium secondary battery has a structure in which an electrode assembly, which includes: a cathode manufactured by coating cathode active materials on a cathode current collector; an anode manufactured by coating anode active materials on an anode current collector; and a porous separator disposed between the cathode and the anode, is impregnated with a lithium salt-containing non-aqueous electrolyte.

In such an electrode structure, an electrode mixture portion contacting the current collector requires high electrical conductivity since the electrode mixture portion transfers electrons to an electrode active material distant from the current collector. Whereas, an electrode mixture portion distant from the current collector requires excellent electrolyte wetting properties to an electocyte and ionic conductivity. In addition, in the electrode mixture portion distant from the current collector, gas generated during charge-discharge processes may be emitted.

Therefore, there is a need to develop a technology that can resolve the above-described requirements.

DISCLOSURE

Technical Problem

The present invention aims to address the aforementioned problems of the related art and to achieve technical goals that have long been waiting to be addressed.

As a result of a variety of extensive and intensive studies and experiments, the inventors of the present invention found that when an electrode including a layer using active materials, diameters of which are different, and a layer using active materials, diameters of which are the same, is used, desired effects may be achieved, thus completing the present invention.

Technical Solution

In accordance with one aspect of the present invention, provided is an electrode for secondary batteries including an electrode mixture coated on one surface or opposite surface of an electrode current collector, wherein a mixture of the electrode includes an electrode mixture layer A close to a current collector and an electrode mixture layer B distant from a current collector, wherein the electrode mixture layer A includes a mixture of two active materials, average diameters of which are different, and the electrode mixture layer B includes active materials, average diameters of which are the same.

Inventors of the present application observed that, in a conventional single layer electrode, an electrolyte is not impregnated to a portion close to an electrode current collector and thereby, electrical conductivity and ionic conductivity are not improved. Therefore, to address the above problem, the inventors reduced porosity by filling spaces between relatively large particles with relatively small particles in a portion close to an electrode current collector and, as such, electrode density was improved. In addition, in a portion distant from an electrode current collector, active materials composed of relatively large particles were used to increase porosity.

Therefore, the electrode includes double electrode mixture layers, electrode densities of which are different. In addition, electrode density of the electrode mixture layer A may be higher than that of the electrode mixture layer B.

In one embodiment, a diameter range of the active materials of the electrode mixture layer A is not particularly limited, and the electrode mixture layer A may be, for example, a mixture of an active material having an average diameter of 1 to 10 μm and an active material having an average diameter of 3 to 30 μm.

Inventors of the present application observed that when one active material having a small average diameter to increase electrode density is used, a specific surface area of the active material is wide and thereby, large amounts of a polymer binder which connects the active materials and a conductive material which forms a conductive passage between active materials are required, resulting in capacity reduction. The inventors also observed that when amounts of a binder and a conductive material are reduced to address this problem, lifespan characteristics of batteries are deteriorated. As a result of considerable study, the inventors confirmed that porosity is reduced and electrode density is increased by inserting the active material having a relatively small diameter between the active material having a relatively large diameter.

Meanwhile, as active materials of the electrode mixture layer B, active materials having relatively low density and large porosity are preferable. Therefore, in one embodiment, an active material, a diameter of which is relatively large and is in a range of 3 to 30 μm, used in the electrode mixture layer A may be used in the electrode mixture layer B. This may prevent cost increase due to use of a separate active material having different diameters.

A ratio of the electrode mixture layer A to the electrode mixture layer B is not particularly limited, and for example, may be—1:9 to 9:1, or 3:7 to 7:3, based on a total thickness of the electrode mixture layers. When a thickness of the electrode mixture layer is too thin and does not included in the above ratio, electrical conductivity is hardly improved. In addition, when a thickness of the electrode mixture layer B is too thin and is not included in the above ratio, electrolyte wetting is deteriorated and ionic conductivity is hardly improved.

In one embodiment, the electrode for secondary batteries may be a cathode including cathode active materials or an anode including anode active materials.

The cathode for a secondary battery may be manufactured by drying and pressing after coating a mixture of cathode active materials, a conductive material and a binder on a cathode current collector. As needed, a filler may further be added to the mixture.

The cathode current collector is generally fabricated to a thickness of 3 to 500 μm. The cathode current collector is not particularly limited so long as it does not cause chemical changes in the fabricated secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between cathode active materials and the cathode current collector. In addition, the cathode current collector may be used in any of various forms including films, sheets, foils, nets, porous structures, foams, and non-woven fabrics.

Examples of the cathode active materials include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \le x \le 0.33$, $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \le x \le 0.3$; lithium manganese composite oxides having the formula $LiMn_{2-x}M_xO_2$ where M=Co, Ni, Fe, Cr, Zn, or Ta, and $0.01 \le x \le 0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; and $Fe_2(MoO_4)_3$.

In one embodiment, the cathode active material may be a lithium manganese composite oxide having a spinel-structure, which is a high electric potential oxide, represented by Formula 1 below.

$$Li_xM_yMn_{2-y}O_{4-z}A_z \qquad (1)$$

wherein $0.9 \le x \le 1.2$, $0 < y < 2$, and $0 \le z \le 0.2$; M refers to at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

Particularly, the lithium manganese composite oxide may be a lithium nickel manganese composite oxide represented by Formula 2 below, more particularly $LiNi_{0.5}Mn_{1.5}O_4$ or $LiNi_{0.4}Mn_{1.6}O_4$.

$$Li_xNi_yMn_{2-y}O_4 \qquad (2)$$

wherein $0.9 \le x \le 1.2$ and $0.4 \le y \le 0.5$.

The conductive material is typically added in an amount of 1 to 50 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the electrode active materials and the conductive material and in binding of the electrode active materials to the cathode current collector. The binder is typically added in an amount of 1 to 50 wt % based on the total weight of the mixture including the cathode active materials. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

On the other hand, the anode is manufactured by coating, drying and pressing anode active materials on an anode current collector. As needed, the anode may further include the above conductive material, binder, filler or the like, selectively.

An anode current collector is typically fabricated to a thickness of 3 to 500 μm. The anode current collector is not particularly limited so long as it does not cause chemical changes in the fabricated secondary battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and anode active materials. In addition, the anode current collector may be used in various forms including films, sheets, foils, nets, porous structures, foams, and non-woven fabrics.

Examples of the anode active materials include carbon such as hard carbon and graphite-based carbon; metal composite oxides such as $Li_xFe_2O_3$ where $0 \le x \le 1$, $Li_xWO_2$ where $0 \le x \le 1$, and $Sn_xMe_{1-x}Me'_yO_z$ where Me: Mn, Fe, Pb or Ge; Me': Al, B, P, Si, Group I, Group II and Group III elements, or halogens; $0 < x \le 1$; $1 \le y \le 3$; and $1 \le z \le 8$); lithium metals;

lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based materials; titanium oxide; lithium titanium oxide; and the like.

In one embodiment, the anode active materials may be lithium metal oxides represented by Formula 3 below.

$$Li_aM'_bO_{4-c}A_c \quad (3)$$

wherein M' is at least one element selected from the group consisting of Ti, Sn, Cu, Pb, Sb, Zn, Fe, In, Al, and Zr; $0.1 \leq a \leq 4$ and $0.2 \leq b \leq 4$ wherein a and b are determined according to oxidation number of M'; $0 \leq c < 0.2$ wherein c is determined according to oxidation number; and A is at least one monovalent or divalent anion.

Particularly, the lithium metal oxide of Formula 3 may be a lithium titanium oxide (LTO) represented by Formula 4 below, more particularly $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$ or the like. So long as lithium ions may be intercalated and deintercalated, a composition and type of the lithium metal oxide ion are not limited. More particularly, the lithium metal oxide of Formula 3 may be $Li_{1.33}Ti_{1.67}O_4$ or $LiTi_2O_4$, which is a spinel-structure having a small crystal structure change during charge-discharge and high reversibility.

$$Li_aTi_bO_4 \quad (4)$$

wherein $0.5 \leq a \leq 3$ and $1 \leq b \leq 2.5$.

In one embodiment, as an anode active material, lithium titanium oxide (LTO) having low electrical conductivity is preferable for the above electrode structure. In addition, in this case, as a cathode active material, a spinel-structure lithium nickel manganese composite oxide of $LiNi_xMn_{2-x}O_4$, having a relatively high electric potential due to high electric potential of LTO, represented by Formula 2 is preferable.

The present invention also provides a secondary battery, particularly, a lithium secondary battery, including the electrode.

The secondary battery having the above-described structure may have a structure in which an electrode assembly including a cathode, an anode, and a separator disposed therebetween is impregnated with a lithium salt-containing electrolyte.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may serve as both the separator and electrolyte.

The lithium salt-containing electrolyte is composed of an electrolyte and a lithium salt. As the electrolyte, a non-aqueous organic solvent, an organic solid electrolyte, or an inorganic solid electrolyte may be used, but embodiments of the present invention are not limited thereto.

For example, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ethers, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In one embodiment, a lithium salt-containing non-aqueous electrolyte may be manufactured by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

The present invention also provides a battery module including the secondary battery as a unit battery and a battery pack including the battery module. In addition, the present invention provides devices including the battery pack.

Particularly, the battery pack may be used as a power source for medium and large devices that require stability at high temperature, long cycle life, and high rate characteristics.

Examples of such devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

The present invention provides a method of manufacturing an electrode for secondary batteries having an electrode mixture coated on one surface or opposite surface of an electrode current collector, the method including:

(i) first coating an electrode mixture including a mixture of two active materials, average diameters of which are different, on the electrode current collector; and (ii) second coating an electrode mixture including active materials, average diameters of which are the same, on the first coated electrode.

In one embodiment, after the first coating process of the above step (i), a drying process may further be included. The electrode mixture layer B may be coated on the electrode mixture layer A without a drying process. However, by adding a drying process, mixing of the electrode mixture layers with each other may be prevented.

In addition, the method of manufacturing the electrode may further include processes of drying and pressing the electrode after the second coating.

MODE FOR INVENTION

Now, the present invention will be described in more detail with reference to the following examples. These examples are provided only for illustration of the present invention and should not be construed as limiting the scope and spirit of the present invention.

Example 1

Fabrication of Cathode

A mixture of $LiNi_{0.5}Mn_{1.5}O_4$ having an average diameter of 1 μm and $LiNi_{0.5}Mn_{1.5}O_4$ having an average diameter of 5 μm was used as an active material. The $LiNi_{0.5}Mn_{1.5}O_4$ mixture, Denka black as a conductive material and PVdF as a binder were mixed in a volume ratio of 90:5:5 in NMP to manufacture a cathode mixture layer A. The cathode mixture was coated on Al foil having a thickness of 20 μm, following a drying process. Thereafter, $LiNi_{0.5}Mn_{1.5}O_4$ having an average diameter of 5 μm as an active material, Denka black as a conductive material and PVdF as a binder were mixed in a volume ratio of 90:5:5 in NMP, to manufacture a cathode mixture layer B. This cathode mixture was coated on the cathode mixture layer A, following pressing and drying processes. As a result, a cathode including the cathode mixture layer A having a thickness of 15 μm, the cathode mixture layer B having a thickness of 35 μm was manufactured.

Fabrication of Anode

A mixture of $Li_{1.33}Ti_{1.67}O_4$ having an average diameter of 1 μm and $Li_{1.33}Ti_{1.67}O_4$ having an average diameter of 5 μm was used as an active material. The $Li_{1.33}Ti_{1.67}O_4$ mixture, Denka black as a conductive material and PVdF as a binder were mixed in a volume ratio of 90:5:5 in NMP to manufacture an anode mixture layer A. The anode mixture was coated on Cu foil having a thickness of 20 μm, following a drying process. Thereafter, $Li_{1.33}Ti_{1.67}O_4$ having an average diameter of 5 μm as an active material, Denka black as a conductive material and PVdF as a binder were mixed in a volume ratio of 90:5:5 in NMP to manufacture an anode mixture layer B. This anode mixture was coated on the anode mixture layer A, following pressing and drying processes. As a result, an anode including the anode mixture layer A having a thickness of 15 μm and the anode mixture layer B having a thickness of 35 μm was manufactured. As a result, an anode including the anode mixture layer A having a thickness of 15 μm and the anode mixture layer B having a thickness of 35 μm was manufactured.

Example 2

A cathode and anode were manufactured in the same manner as in Example 1, except that the cathode mixture layer A and anode mixture layer A were coated to a thickness of 35 μm, and the cathode mixture layer B and anode mixture layer B were coated to a thickness of 15 μm.

Example 3

A cathode and anode were manufactured in the same manner as in Example 1, except that the cathode mixture layer A and anode mixture layer A were coated to a thickness of 5 μm, and the cathode mixture layer B and anode mixture layer B were coated to a thickness of 45 μm.

Example 4

A cathode and anode were manufactured in the same manner as in Example 1, except that the cathode mixture layer A and anode mixture layer A were coated to a thickness of 10 μm, and the cathode mixture layer B and anode mixture layer B were coated to a thickness of 40 μm.

Comparative Example 1

$LiNi_{0.5}Mn_{1.5}O_4$ having an average diameter of 5 μm was used as an active material. The $LiNi_{0.5}Mn_{1.5}O_4$, Denka black as a conductive material and PVdF as a binder were mixed in a volume ratio of 90:5:5 in NMP. This mixture was coated on Al foil having a thickness of 20 μm, followed by pressing and drying processes. As a result, a cathode having a thickness of 50 μm was manufactured. The $Li_{1.33}Ti_{1.67}O_4$ as an active material, Denka black as a conductive material and PVdF as a binder were mixed in a volume ratio of 90:5:5 in NMP. This mixture was coated on Cu foil having a thickness of 20 μm, followed by pressing and drying processes. As a result, an anode having a thickness of 50 μm was manufactured.

Comparative Example 2

A cathode and anode were manufactured in the same manner as in Example 1, except that $LiNi_{0.5}Mn_{1.5}O_4$ having an average diameter of 1 μm was used alone as a cathode active material included in the cathode mixture layer A, and $Li_{1.33}Ti_{1.67}O_4$ having an average diameter of 1 μm was used alone as an anode active material included in an anode mixture layer A.

Experimental Example 1

Rate Characteristics Assessment

To manufacture a lithium secondary battery, porous polyethylene separators were disposed between the cathodes and the anodes manufactured in Examples 1 to 4 and Comparative Examples 1 and 2 and then a 1 M $LiPF_6$ lithium electrolyte was injected into pouches.

To confirm rate characteristics of the manufactured batteries, capacities were measured at a rate of 5 C. Results are shown in Table 1 below.

TABLE 1

| | Rate characteristics (5 C-rate, capacity ratio, %) |
|---|---|
| Example 1 | 95 |
| Example 2 | 96 |
| Example 3 | 91 |
| Example 4 | 92 |
| Comparative Example 1 | 87 |
| Comparative Example 2 | 88 |

As seen in Table 1 above, rate characteristics of batteries utilizing the electrodes of Examples 1 to 4 in accordance with the present invention were 90% or more. Therefore, rate characteristics of batteries utilizing the electrode of Examples 1 to 4 were superior, compared to those of batteries utilizing the electrodes of Comparative Examples 1 and 2.

Particularly, rate characteristics of batteries utilizing the electrodes of Examples 1 and 2, in which a thickness of each electrode mixture layer is constant, were 95% or more. Therefore, rate characteristics of batteries utilizing the electrodes of Examples 1 to 2 were superior, compared to those of batteries utilizing the electrodes of Examples 3 and 4.

Experimental Example 2

Lifespan Characteristics Assessment

To measure lifespan characteristics of the lithium secondary batteries manufactured in Experimental Example 1, 300 charge/discharge cycles at 1 C/1 C and 300 charge/discharge cycles at 3 C/3 C were performed. Results are shown in Table 2 below.

TABLE 2

| | Lifespan characteristics (1 C/1 C, capacity (%) at $300^{th}$ cycle) | Lifespan characteristics (3 C/3 C, capacity (%) at $300^{th}$ cycle) |
|---|---|---|
| Example 1 | 90 | 90 |
| Example 2 | 91 | 91 |
| Example 3 | 90 | 85 |
| Example 4 | 91 | 88 |
| Comparative Example 1 | 90 | 80 |
| Comparative Example 2 | 90 | 82 |

As seen in Table 2 above, capacities of the batteries utilizing the electrodes of Examples 1 and 2 were maintained at 90% or more at all of 1 C/1 C and 3 C/3 C. Whereas, capacities of the batteries utilizing the electrodes of Examples 3 and 4 were maintained at 90% or more at 1 C/1 C and to 85% or more at 3 C/3 C. As a result, lifespan characteristics of the batteries utilizing the electrodes of Examples 1 to 4 were superior, compared to those of the batteries utilizing the electrodes of Comparative Examples 1 to 2. Particularly, when a rate is low, there is no great difference between lifespan characteristics of Examples 1 to 4 and lifespan characteristics of Comparative Examples 1 to 2. However, when a rate is high, the batteries utilizing the electrodes according to the present invention exhibited superior cycle characteristics, compared to Comparative Examples 1 to 2

Meanwhile, comparing Examples 1 and 2 to Examples 3 and 4, cycle characteristics of the electrodes in which a thickness of each electrode mixture layer is constant were excellent. Such a result is similar to that of rate characteristics of Experimental Example 1.

Considering combined results of Experimental Examples 1 and 2, the batteries utilizing the electrodes of Examples 1 to 4 exhibited superior rate characteristics and lifespan characteristics, compared to those utilizing the electrodes of Comparative Examples 1 and 2.

In Examples 1 to 4 in accordance with the present invention, first, the electrode mixture including active materials, averages diameter of which were different, was coated on foils. Second, the electrode mixture including active materials, average diameters of which were the same, was coated on the coated foils. As a result, an electrode, density of which is higher in a portion close to the electrode current collector, was manufactured and, as such, electronic conductivity, electrolyte wetting, ionic conductivity and the like were improved. Whereas, in Comparative Example 1, one electrode mixture layer type is present and, as such, neither electrical conductivity nor ionic conductivity was improved. In Comparative Example 2, active materials of the electrode mixture layer close to an electrode current collector have wide specific surface areas and, as such, there may be a lack of conductive material and binder to connect the specific surface areas.

Meanwhile, although the electrode having a double layer identical to the present invention is used in Examples 1 and 2, and Examples 3 and 4, a thickness ratio of each electrode mixture layer has an effect on battery performance. Namely, in Examples 3 and 4, thicknesses of the electrode mixture layers close to the electrode current collector are thinner than those of the electrode mixture layers distant from the electrode current collector and, as such, improvement in electrical conductivity is limited.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an electrode for secondary batteries manufactured with a multi layered electrode using active materials in which combinations of average diameters are different according to the present invention have an improved electrolyte wetting property, ionic conductivity, electrical conductivity and the like and thereby, electrochemical performance of the secondary battery including the same may be improved.

The invention claimed is:

1. A lithium secondary battery comprising a cathode and an anode as electrodes, wherein each of the electrodes comprises an electrode mixture layer A close to the electrode current collector and an electrode mixture layer B distant from the electrode current collector, wherein the electrode mixture layer A comprises a mixture of two active materials having different average diameters and the electrode mixture layer B comprises active materials having the same average diameters, wherein a ratio of the electrode mixture layer A to the electrode mixture layer B is 1:9 to 3:7, based on a total thickness of the electrode mixture layers, wherein a thickness of the electrode mixture layer A is 5 to 35 μm, wherein the cathode comprises a spinel-structure lithium nickel manganese composite oxide (LNMO) represented by Formula 2 below as cathode active materials, wherein the anode comprises a lithium titanium oxide (LTO) represented by Formula 4 below as anode active materials:

$$Li_xNi_yMn_{2-y}O_4 \quad (2)$$

wherein $0.9 \leq x \leq 1.2$, and $0.4 \leq y \leq 0.5$ $$Li_aTi_bO_4 \quad (4)$$

wherein $0.5 \leq a \leq 3$ and $1 \leq b \leq 2.5$.

2. The lithium secondary battery according to claim 1, wherein the active materials of the electrode mixture layer A comprise a mixture of an active material having an average diameter of 1 to 10 μm and an active material having an average diameter of 3 to 30 μm.

3. The lithium secondary battery according to claim 1, wherein the active materials of the electrode mixture layer B comprise active materials having an average diameter of 3 to 30 μm.

4. The lithium secondary battery according to claim 1, wherein electrode density of the electrode mixture layer A is higher than electrode density of the electrode mixture layer B.

5. The lithium secondary battery according to claim 1, wherein the lithium nickel manganese composite oxide of Formula 2 is $LiNi_{0.5}Mn_{1.5}O_4$ or $LiNi_{0.4}Mn_{1.6}O_4$.

6. The lithium secondary battery according to claim 1, wherein the lithium titanium oxide of Formula 4 is $Li_{1.33}Ti_{1.67}O_4$ or $LiTi_2O_4$.

7. The lithium secondary battery according to claim 1 as a unit battery.

8. A battery pack comprising the battery module according to claim 7.

9. A device comprising the battery pack according to claim 8.

10. The device according to claim 9, wherein the device is an electric vehicle, a hybrid electric vehicle, a plug-in hybrid electric vehicle, or a system for storing power.

11. A method of manufacturing the lithium secondary battery of claim 1, the method comprising:
(i) first coating an electrode mixture including a mixture of two active materials, average diameters of which are different, on the electrode current collector; and
(ii) second coating an electrode mixture including active materials, average diameters of which are the same, on the first coated electrode.

12. The method of manufacturing the lithium secondary battery of claim 11 further comprising a drying process after the first coating.

13. The method of manufacturing the lithium secondary battery of claim 11 further comprising drying and pressing processes after the second coating.

* * * * *